Patented Oct. 29, 1946

2,410,301

UNITED STATES PATENT OFFICE 2,410,301

MANUFACTURE OF COPPER PHTHALO-CYANINE DYESTUFFS

Grady M. O'Neal, Chicago, Ill., assignor to The Sherwin-Williams Company, Cleveland, Ohio, a corporation of Ohio No Drawing. Application September 15, 1943, Serial No. 502,506

24 Claims. (Cl. 260—314.5)

The present invention relates to the manufacture of copper phthalocyanine dyestuffs.

Phthalocyanine is a generic term for a class of blue to green dyestuffs and the following formula has been proposed for the metal-free phthalocyanine parent substance:

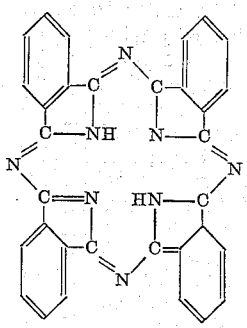

It may be systematically designated as either tetrabenzoporphyrazine or as tetra-benzo-tetra-aza-porphin.

Because of the economics and the difficulties connected with securing the intermediates used in preparing the parent and derivative substances, for example, o-cyanobenzamide or phthalonitrile, it has been proposed to employ other simpler and more readily available initial starting materials. Processes have been offered in which a carbocyclic anhydride, imide, or diamide is reacted with ammonia and metallic substances, thereby, under appropriate conditions, resulting in metallic phthalocyanine color formation. Processes making use of this method of synthesis, in general, are subject to these serious objections: poor yields are almost invariably obtained; great operational difficulties are present; and the resultant dyestuff is of poor quality due at least in part to the necessary high operating temperatures needed to effect color formation.

Other processes, notably those covered in U. S. Patents Nos. 2,216,761, 2,216,867, and 2,216,868, and likewise directed towards a simplification of the process for phthalocyanine dyestuff manufacture, have been proposed, using aminosulphonic acid type compounds, with which certain dehydration and deamidation products of diammonium phthalate, for instance, phthalic anhydride, phthalimide, phthaldiamide, and the like, are reacted with a metallic reagent. In general, along with other objections, the temperatures necessary to effect dyestuff formation are high and the quality of the obtained dyestuffs is poor.

It has further been proposed in Fr. Patent No. 826,017 to react a phthalic acid derivative, dicyandiamide, and a metal-bearing reagent under special conditions to give the metallic phthalocyanine. However, the yields of dyestuff by this process are extremely poor; the operating temperatures are high, giving poor quality dyestuffs; and still worse, the reaction of dicyandiamide with phthalic acid derivatives is a highly exothermic one, often times proceeding with extreme violence.

Still other processes, as exemplified in U. S. Patents Nos. 2,197,458, 2,197,459, and 2,214,477, have been proposed, using urea with which certain dehydration and deamidation products of diammonium phthalate, for instance, phthalic anhydride, phthalimide, phthaldiamide and the like, and a metallic reagent are suitably reacted. This proposed process possesses high merit, but it has the disadvantage that the process is accompanied by undesirable foaming and frothing of the reaction melt. Due to the nature and volume of these foams, the reaction mass cannot be kept at the necessary temperature of reaction. Consequently, processes making use of the "urea method" of synthesis commonly yield a relatively low amount of the desired dyestuff; processing equipment is unduly large with respect to the actual quantity of material processed; and a certain amount of danger to the operating personnel is always present.

Hoyer et al. in U. S. Alien Property Custodian, Serial No. 403,866 have proposed that the disadvantages inherent with the "urea process" for phthalocyanine dyestuff formation could be overcome by effecting the "urea process" in the presence of auxiliary agents such as aromatic carboxylic acids or sulfonic acids or the amides thereof, these agents not being capable of conversion into phthalocyanines. This proposal has numerous disadvantages among which are: it is economically wastful due to the excessive amounts of auxiliary agent required; and it is specific only to phthalocyanine-forming starting materials that contain sulfonic acid groups or carboxyl groups in addition to the carboxyl acid groups that take part in the phthalocyanine color-forming reaction.

It is therefore seen that the present state of the art is such that no existing phthalocyanine dyestuff process successfully combines the desired optimum of economy of starting materials, simplicity and ease of operation, safety, and quality. The availability of such a process would fill a long-felt need and, because of numerous dependent factors, make the copper phthalocyanine dyestuffs available for wider and more general employment, as well as for entirely new usages. My present invention relates to such a process, heretofore much desired, but not available.

The present invention aims to provide a simple, practical, economic, and novel process for manufacturing copper phthalocyanines which may be practiced upon a variety of substituted and unsubstituted benzene ortho-dicarboxylic acid compounds or certain of their dehydrated and deamidated products.

A particular object of the invention is the formation of copper phthalocyanine dyestuffs by reacting the said substituted and unsubstituted benzene ortho-dicarboxylic acid compounds, or their said derivatives, with biuret and a copper compound.

A further object of the invention is to accomplish the reaction of the said substituted and unsubstituted benzene ortho-dicarboxylic acid compounds, or their said derivatives, with biuret and a copper-yielding compound in the presence of an auxiliary agent.

A still further object of the invention is to effect formation of the copper phthalocyanine dyestuffs without the excessive foaming and frothing peculiar to other processes of the prior art.

Various other ancillary objects and advantages will appear from the following detailed description and explanation of the invention.

These objects may be accomplished by reacting an ortho aromatic compound of the generic formula:

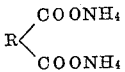

minus $x$H$_2$O, minus $y$ NH$_3$, with biuret and a copper-yielding compound. An auxiliary agent is also present. R is a benzene nucleus and may contain various substituents such as halogen, nitro, amino, aryl, alkyl, aryloxy, alkoxy, sulfo, carboxyl, sulfonyl, benzoyl, and the like. These substituents may appear more than once and they may be in combination. $x$ is an integer which may vary from 0 through 3; $y$ is an integer which may vary from 0 through 2, but the sum of $x$ and $y$ does not exceed 3.

The copper phthalocyanine dyestuffs that may be prepared according to this invention may be expressed by this generic formula:

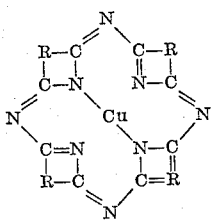

wherein R consists of a benzene nucleus which may possess the substituents enumerated hereinabove.

In effecting the objects of the present invention, the chemical mechanism of the process is not entirely understood. Apparently, on the basis of present work, the aromatic compound first reacts with the biuret to form an addition product. This addition product, as a result of heat, then undergoes a dehydration, deamination, and decomposition in the presence of the auxiliary agent and a copper-yielding compound to give the desired dyestuff formation. This may not be, however, the correct or entire explanation.

Biuret, also known as allophanamide, may be considered as a urea derivative or a deammonation product of urea. It is well known that urea is a substantially neutral, if not slightly alkaline, substance, while biuret possesses acid properties. See "The Nitrogen System Of Compounds"—Franklin, pp. 114 and 118 (1935). While biuret may be obtained from urea by a mere heating, its preparation is best performed by conducting the urea transformation under special conditions, cf., U. S. Patent No. 2,145,392 or Vanino's "Praparative Chemie—Organischer Teil," p. 221 (1937). This is done because the amount of biuret formed from heat transformation of urea at atmospheric pressure is very small due to the fact, that as the temperature is raised or the heating prolonged in order to convert more of the urea, formation of an increasing amount of by-products, such as ammelide and cyanuric acid, occurs and the yield of biuret remains quite low. To illustrate: heating of urea at 147–152° C. for nine hours gives a yield of biuret (anhydrous basis) of only 12.0%; and heating at 147–152° C. for 43 hours gives a yield of only 13.1%. Likewise, biuret, when heated slightly above its melting point, say at 200° C. for one hour, is completely decomposed, giving water-insoluble and gaseous products and a small quantity of material melting at 103–106° C.

It is well known that phthalic anhydride and urea react together to give the monoureide at 118–124° C., cf. Piutti, "Liebig's Annalen der Chemie," 1882, 214, pp. 17–30. Further, the interaction of phthalic anhydride and urea to give phthalimide according to the equation:

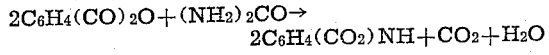

by heating at 130–150° C. is well known and is a standard method for preparing phthalimide.

Other urea derivatives, notably formamide, dicyandiamide, ammonium carbonate, ammonium carbamate, guanylurea, guanidine, thiourea, carbonyl urea, monosodium urea, methylol urea, ammelin, ammelide, cyanuric acid, and cyanamide, have been reacted with phthalic anhydride in accordance with the procedure of the present invention. These urea derivatives either give no dyestuff formation, or a product that is worthless.

In perfecting the present invention, it has been found that the interaction of the described substituted or unsubstituted benzene ortho-dicarboxylic acid compounds or their derivatives, with biuret and the copper-yielding compound proceeds with poor yields of dyestuff, even when the operating temperatures are either low, as at 185–200° C., or high, as at around 250–275° C. It is only through the use of various auxiliary materials that dyestuff formation proceeds at comparatively low temperatures in high yields and with good quality. These auxiliary agents are specific in nature and only a few seem effectively to assist in the dyestuff formation. Their exact role is unknown. Of some value are those agents containing the elements: antimony, tungsten, selenium, and boron; and of particular value are those agents containing the elements: molybdenum, arsenic, and vanadium. These elements are all characterized by having acid oxides. The effectiveness and variations of various elements in favoring copper phthalocyanine dyestuff formation may be viewed in the light of subsequent Table I. The auxiliary agents functioning in the process of the present invention include salts, oxides, acids, and inorganic and organic complexes. Two or more elements may exist in a compound functioning as an auxiliary agent, for example, a vanado-molybdic acid.

The quantity of auxiliary agent present in the reaction mass may vary, indicating its functioning in the nature of a catalyst. Small quantities in terms of the total reaction mass have a very marked and pronounced effect. Even with as low as 0.08% in terms of the weight of the reaction mass, favorable action in lowering the formative color reaction temperature is observed, as well as an increased yield of the resulting copper phthalocyanine dyestuff. When the quantity of auxiliary agent is increased much beyond 2%, very little added benefit obtains. Therefore, in the appended claims the auxiliary agent is referred to as a "catalyst."

By the process of the present invention, color formation has been observed at temperatures as low as 135–140° C. It is generally preferred, however, for optimum results to carry out the reaction in the neighborhood of 175–195° C. The preferred range is 160–200° C. The reaction may be conducted at temperatures in excess of 200° C., and as high as 300° C., but with increased temperatures of reaction over about 200° C. the quality and yield of the formed dyestuff suffers, in part at least due to loss of biuret by decomposition.

Although the reagents for the reaction mass may be associated in a variety of ways, it is preferred that they be associated in stages, thus utilizing progressive synthesis. This preference gives a method of reacting to secure the desired features of economy, quality, and ease of manipulation.

The quantity of biuret employed in the present process may vary, as described hereinafter, and the preferred range is between 1.5–2.0 moles.

The copper phthalocyanines of the present invention are preferably made by reaction under exposure to the atmosphere. But they may also be prepared by heating the aromatic compound with the biuret, auxiliary agent, and copper-yielding compound in a closed vessel under pressure, often times with particularly advantageous results.

As copper-yielding compounds it is preferred to use copper salts. Among those that have been used to advantage are the chlorides, bromides, acetates, and sulfates. Generally, these copper salts are most advantageously employed in the anhydrous state. The copper compounds may be any of those known in the art for making copper phthalocyanine dyestuff.

My invention may best be illustrated by reference to the following specific examples of its application to actual practice, although it is to be understood that they are given merely as illustrations and are not to be construed as limiting the scope of the invention. In the examples that follow, all parts are given by weight.

EXAMPLE 1

36.0 parts of biuret (M. P. 189–190° C.) are heated in a suitable vessel fitted with an agitator. When the internal temperature is at 135–140° C., 30.0 parts of phthalic anhydride are added over a 25 minute period with the agitated mass being held within the 135–140° C. range. Then 0.06 part of ammonium molybdate,

$(NH_4)_6Mo_7O_{24}.4H_2O$ and 7.5 parts of anhydrous cupric chloride are added over a 10 minute period. The reaction mass at this point is a thick paste.

With continued agitation throughout the ensuing reaction period, the reaction temperature is raised during 1¼ hours until an internal temperature of 185–190° C. is reached. During this temperature rise, 0.5 part portions of biuret are added at approximately 2.7 minute intervals until a total of 14.0 parts has been added. The temperature rise and biuret additions are so adjusted that the mass is at all times a fairly viscous paste.

During the temperature rise from 135–140° C. the reaction mass becomes greener and darker. At 160–170° C. a coppery bronze appears and shortly thereafter, a dark reddish-blue coloration.

The mass is then held at 185–190° C. for two hours, and then cooled, and ground to a powder. The resulting powder is then extracted with 1,000 parts of a dilute aqueous solution of caustic soda, preferably a 2.5% solution by weight, by heating at the boiling temperature for 10 minutes. A filtration and washing with water to neutrality is then performed. A second extraction, this time with 1,000 parts of a 5% aqueous hydrochloric acid solution, is now performed in the manner of the caustic soda treatment. This is similarly followed by a filtration and water washing to neutrality of the filter cake. The neutral filter cake is then dried, giving a yield of 23.6 parts of a copper phthalocyanine. This corresponds to a yield of 76.2% of theory, based on the phthalic anhydride and considering the product as a monochlorinated copper phthalocyanine.

The said copper phthalocyanine crude may then be conditioned for use as a pigment in one of many known ways, preferably that of my co-pending application, Serial No. 381,396, filed March 1, 1941. The conditioned pigment has excellent quality and high tinctorial value.

EXAMPLE 2

In a preparation similar to that of Example 1, a molecular equivalent of anhydrous cupric bromide is employed as the copper-yielding material. The obtained copper phthalocyanine resembles the copper phthalocyanine of Example 1, in properties, and is thought to contain a brominated form. It is obtained in the amount of 24.5 parts and possesses pigmentary properties of a high order.

EXAMPLE 3

51.4 parts of a commercial biuret having by analysis a composition given as follows: 70–75% biuret, 15–20% cyanuric acid, and 10% ammelide, are ground and mixed with 30.0 parts of phthalic anhydride, 0.06 part of ammonium molybdate and 7.5 parts of anhydrous cupric chloride. The resulting powdery mass is placed into a suitable vessel and, with agitation, the temperature is raised over a ¾ hour period until an internal temperature of 185–190° C. is attained. A two hour reaction period at this temperature is maintained with stirring throughout the period. At the end of this time the reaction mass is worked up in the manner of Example 1 to give 18.0 parts of copper phthalocyanine.

During the reaction period the mass is a heavy paste and no frothing or foaming occurs. This example illustrates a somewhat different procedural method, as well as a variation in the composition of the active biuret ingredient.

EXAMPLE 4

36.0 parts of biuret (M. P. 189–190° C.) are placed into a suitable reaction vessel fitted with an agitator. Agitation is carried on throughout the reaction period. The temperature of the biuret is raised to 160–165° C., then 30.0 parts of phthalic anhydride are added over a 30–40 minute period within the 160–165° C. range. Then 0.06 part of ammonium molybdate and 8.9 parts

| Example | Employed ortho-dicarboxylic acid compound | Employed copper-yielding material | Parts yield of phthalocyanine dyestuff |
|---|---|---|---|
| 6 | Phthalic acid | Cupric sulfate | 16.0 |
| 7 | Phthalimide | do | 17.4 |
| 8 | Phthaldiamide | do | 20.8 |
| 9 | Diammonium phthalate | Cupric chloride | 12.1 |

It has been mentioned hereinabove that the choice and nature of the auxiliary agent has considerable bearing on the ease with which the benzene ortho-dicarboxylic acid compound, the biuret, and copper-yielding compound, effect dyestuff formation. In Table I which follows, the procedure employed for the results was exactly like that of Example 4 except that the reaction temperature was in the range of 185–200° C., the period of final reaction was two hours, and the copper-yielding material was a chemical equivalent of anhydrous cupric chloride in terms of copper.

*Table I*

| Item | Nature of auxiliary agent | Chemical formula of auxiliary agent | Parts of auxiliary agent employed | Per cent auxiliary agent in terms of reaction mass | Active auxiliary element's periodic group | Parts obtained of extracted copper phthalocyanine |
|---|---|---|---|---|---|---|
| 1 | None | | | | | 1.2 |
| 2 | Ammonium molybdate | $(NH_4)_6Mo_7O_{24}.4H_2O$ | 0.06 | 0.08 | VI | 20.6 |
| 3 | do | do | 1.47 | 2.0 | VI | 21.7 |
| 4 | do | do | 3.68 | 5.0 | VI | 21.6 |
| 5 | Sodium molybdate | $Na_2MoO_4.2H_2O$ | 1.47 | 2.0 | VI | 21.6 |
| 6 | Molybdic acid (anhyd.) | $MoO_3$ | 1.47 | 2.0 | VI | 21.9 |
| 7 | Silico-molybdic acid | $H_4SiMo_{12}O_{40}.XH_2O$ | 1.47 | 2.0 | VI | 21.2 |
| 8 | Ammonium metavanadate | $NH_4VO_3$ | 1.47 | 2.0 | V | 15.0 |
| 9 | Arsenous oxide | $As_2O_3$ | 1.47 | 2.0 | V | 11.8 |
| 10 | Antimony trioxide | $Sb_2O_3$ | 1.47 | 2.0 | V | 7.0 |
| 11 | Boric acid | $H_3BO_3$ | 1.47 | 2.0 | III | 7.0 |
| 12 | Zinc oxide | $ZnO$ | 1.47 | 2.0 | II | 1.2 |
| 13 | Mecuric oxide | $HgO$ | 1.47 | 2.0 | II | 2.6 |
| 14 | Aluminum oxide | $Al_2O_3$ | 1.47 | 2.0 | III | 3.4 |
| 15 | Sodium carbonate | $Na_2CO_3$ | 1.47 | 2.0 | IV | 1.1 |
| 16 | Lead oxide | $Pb_3O_4$ | 1.47 | 2.0 | IV | 1.0 |
| 17 | Sodium stannate | $Na_2SnO_3.3H_2O$ | 1.47 | 2.0 | IV | 1.2 |
| 18 | Lead titanate | $PbTiO_3$ | 1.47 | 2.0 | IV | 2.4 |
| 19 | Bismuth trioxide | $Bi_2O_3$ | 1.47 | 2.0 | V | 2.2 |
| 20 | Diammonium phosphate | $(NH_4)_2HPO_4$ | 0.48 | 0.65 | V | 3.4 |
| 21 | Ammonium persulfate | $(NH_4)_2S_2O_8$ | 1.47 | 2.0 | VI | 0.8 |
| 22 | Tungstic acid | $H_2WO_4$ | 1.47 | 2.0 | VI | 4.9 |
| 23 | Ammonium chromate | $(NH_4)_2CrO_4$ | 1.47 | 2.0 | VI | 3.1 |
| 24 | Selenium oxide | $SeO_2$ | 1.47 | 2.0 | VI | 5.0 |
| 25 | Potassium iodate | $KIO_3$ | 1.47 | 2.0 | VII | 0.7 |
| 26 | Potassium permanganate | $KMnO_4$ | 1.47 | 2.0 | VII | 2.9 |
| 27 | Ferric oxide | $Fe_2O_3$ | 1.47 | 2.0 | VIII | 1.5 | of anhydrous cupric sulfate are added over a 20 minute period. The reaction mass, at this point a fairly liquid paste, is heated and the reaction temperature raised over a 30 minute period until an internal temperature of 180–185° C. is reached. Three hours heating follows at this temperature. The resulting color mass is then processed, as in Example 1, giving 18.6 parts of copper phthalocyanine. The obtained dyestuff possesses excellent pigmenting properties and is redder in shade than the copper phthalocyanine of Example 1.

EXAMPLE 5

By substituting a molecular equivalent of anhydrous cupric acetate for the cupric sulphate of Example 4, copper phthalocyanine can be obtained in likewise good yield.

Further examples and results are shown in the following table. In these the phthalic anhydride is replaced by a chemical equivalent of benzene ortho-dicarboxylic acid or a derivative of it, and likewise the copper salt is an anhydrous equivalent where different.

It is seen, therefore, from the data of Table I that the interaction of biuret, phthalic anhydride and the copper-yielding material, without the auxiliary agent, is of little value for all practical purposes. On the other hand, when certain specific auxiliary agents are employed, useful yields of copper phthalocyanine result.

It has been mentioned hereinabove that the aromatic compound may have other substituents present in the benzene nucleus besides the hydrogen illustrated in the preceding examples. Typical substituted benzene ortho-dicarboxylic acid compounds that may be employed in the process of the present invention are: 3,4-dimethyl-phthalic acid, 4-chloro-phthalic acid, 4-nitro-phthalic acid, 4-ethoxy-phthalic acid, 3-phenoxy-phthalic acid, 4-acetamino phthalic acid, 4-phenyl-phthalic acid, N-benzenesulfonyl-4-amino-phthalic acid, and others. Likewise, these various substituted benzene ortho-dicarboxylic acids may be employed in the form of their anhydrides, imides, diamides, and the like. A typical example illustrating the use of a substituted derivative of benzene ortho-dicarboxylic acid in preparing copper phthalocyanine dyestuffs in accordance with the present invention follows:

EXAMPLE 10

The procedure of Example 1 is repeated, except that the 30.0 parts of phthalic anhydride are replaced by 39.0 parts of 4-nitro-phthalimide (M. P. 197.5–198° C.). The yield of dry copper tetra-nitro-phthalocyanine, after the extractions and washings, amounted to 34.5 parts or 89.9% of theory. It is a blue-green dyestuff.

It has been indicated earlier that the initial starting intermediates that are suitable for employment in my new and novel process are all related and may be regarded, for purposes of classification, as transformation products of a substituted or unsubstituted diammonium phthalate compound. In the foregoing examples, the use of phthalic anhydride, phthalic acid, phthalimide, phthaldiamide, and diammonium phthalate have been illustrated. Each of these color-forming compounds may be regarded as a transformation product of diammonium phthalate in terms of integer mole units of $NH_3$ and $H_2O$; for example, the entire class of transformation products possible from diammonium phthalate and applicable in the present invention may be expressed as follows:

Phthalic acid=diammonium phthalate minus $2NH_3$ and $OH_2O$
Phthalic anhydride=diammonium phthalate minus $2NH_3$ and $1H_2O$
Monoammonium phthalate=diammonium phthalate minus $1NH_3$ and $OH_2O$
Monoammonium o-carbamyl-benzoate=diammonium phthalate minus $ONH_3$ and $1H_2O$
Phthalic acid monoamide=diammonium phthalate minus $1NH_3$ and $1H_2O$
Phthaldiamide=diammonium phthalate minus $ONH_3$ and $2H_2O$
Phthalimide=diammonium phthalate minus $1NH_3$ and $2H_2O$
o-Cyano-benzoic acid=diammonium phthalate minus $1NH_3$ and $2H_2O$
Monoammonium o-cyano-benzoate=diammonium phthalate minus $ONH_3$ and $2H_2O$
o-Cyano-benzamide=diammonium phthalate minus $ONH_3$ and $3H_2O$
Phthalimimide=diammonium phthalate minus $ONH_3$ and $3H_2O$ Some of these compounds cannot be obtained directly from diammonium phthalate, but their relationship is clear from the above explanation, and the value of typical representatives of the group in copper-phthalocyanine-formation has been illustrated. In addition, eleven similar transformation compounds are possible for each derivative form wherein a substituent is, or substituents are, present on the benzene nucleus of the diammonium phthalate.

By examining the formulas above for the phthalocyanines, it is seen that theory calls for 4 benzene rings and 8 nitrogen atoms. Biuret contains 3 nitrogen atoms in one mole. Theoretically, then 2 moles of biuret are required for 3 moles of phthalic anhydride, for example. Thus, 0.66 mole of biuret is the minimum reactive quantity, in theory, for 1 mole of phthalic anhydride, or its equivalent. In Example 1, 2 moles of biuret, and in Examples 3 and 4, approximately 1.5 moles of biuret are employed per mole of benzene nucleus. There is loss of ammonia in the reaction, in part from the reaction, and in part from thermal decompositions. Deficiency or excess of biuret does not affect the character of the reaction, but only the yield of product. The present invention contemplates using relative quantities adjusted to the method of carrying out the reaction, consistently with economic results in comparing yield, time, raw materials and other factors.

In the foregoing examples a novel and unique process for manufacturing copper phthalocyanine dyestuffs has been disclosed and illustrated in a variety of ways. In this process, when the features of the specificity of the auxiliary agent, the improved manipulative features prevailing during the dyestuff formation, the availability of the starting materials, and the uniqueness of biuret as a phthalocyanine dyestuff-forming ingredient when contrasted with the non-phthalocyanine dyestuff-forming properties of other urea derivatives, are considered, it is seen that a notable advance and contribution has been made in the phthalocyanine dyestuff art.

It is intended to cover in the claims which follow all such extensions and variations as would naturally occur from the foregoing, to one skilled in the art.

I claim:

1. The method of making a copper phthalocyanine dyestuff which comprises reacting together at a temperature in the range from 135° to 300° C. and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

2. The method of making a copper phthalocyanine dyestuff which comprises reacting together at a temperature in the range from 135° to 300° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, which catalyst is present in quantity from 0.08% to 2% by weight of the reaction mass, said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

3. The method of making a copper phthalocyanine dyestuff which comprises reacting together at a temperature in the range from 135° to 300° C., and in proportions sufficient to produce copper phthalocyanine, biuret, an ortho compound having the formula: $C_6H_4(COONH_4)_2$, minus $xH_2O$, minus $yNH_3$, and a copper-yielding compound, in the presence of a catalyst for the reaction, said formula being such that $x$ is an integer varying from 0 through 3, $y$ is an integer varying from 0 through 2, both while $x+y$ is not more than 3.

4. The method of making a copper phthalocyanine dyestuff which comprises reacting together at a temperature in the range from 135° to 300° C., and in proportions sufficient to produce copper phthalocyanine, biuret, a phthalic anhydride, and a copper-yielding compound, in the presence of a catalyst for the reaction.

5. The method of making a copper phthalocyanine dyestuff which comprises reacting together at a temperature in the range from 135° to 300° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, which catalyst contains molybdenum; said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

6. The method of making a copper phthalocyanine dyestuff which comprises reacting together at a temperature in the range from 135° to 300° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, which catalyst contains vanadium; said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

7. The method of making a copper phthalocyanine dyestuff which comprises reacting together at a temperature in the range from 135° to 300° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, which catalyst contains arsenic; said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

8. The method of making a copper phthalocyanine dyestuff which comprises reacting together at a temperature in the range from 135° to 300° C., and in proportions sufficient to produce copper phthalocyanine, biuret, phthalimide, and a copper-yielding compound, in the presence of a catalyst for the reaction.

9. The method of making a copper phthalocyanine dyestuff which comprises reacting together at a temperature in the range from 160–200° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

10. The method of making a copper phthalocyanine dyestuff which comprises reacting together at a temperature in the range from 160–200° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, which catalyst is present in quantity from 0.08% to 2% by weight of the reaction mass, said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

11. The method of making a copper phthalocyanine dyestuff which comprises reacting together at a temperature in the range from 160–200° C., and in proportions sufficient to produce copper phthalocyanine, biuret, an ortho compound having the formula: $C_6H_4(COONH_4)_2$, minus $xH_2O$, minus $yNH_3$, and a copper-yielding compound, in the presence of a catalyst for the reaction, said formula being such that $x$ is an integer varying from 0 through 3, $y$ is an integer varying from 0 through 2, both while $x+y$ is not more than 3.

12. The method of making a copper phthalocyanine dyestuff which comprises reacting together at a temperature in the range from 160–200° C., and in proportions sufficient to produce copper phthalocyanine, biuret, phthalic anhydride, and a copper-yielding compound, in the presence of a catalyst for the reaction.

13. The method of making a copper phthalocyanine dyestuff which comprises reacting together at a temperature in the range from 160–200° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, which catalyst contains molybdenum; said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

14. The method of making a copper phthalocyanine dyestuff which comprises reacting together at a temperature in the range from 160–200° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, which catalyst contains vanadium; said formula being such that $x$ is an integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

15. The method of making a copper phthalocyanine dyestuff which comprises reacting together at a temperature in the range from 160–200° C., and in proportions sufficient to produce copper phthalocyanine, biuret, an ortho compound having the formula: $R(COONH_4)_2$, minus $xH_2O$, minus $yNH_3$, and a copper-yielding compound, in the presence of a catalyst for the reaction, which catalyst contains arsenic; said formula being such that $x$ is in integer varying from 0 through 3, $y$ is an integer varying from 0 through 2, both while $x+y$ is not more than 3, and R is a benzene nucleus selected from the group consisting of the unsubstituted benzene nucleus and substituted benzene nuclei.

16. The method of making a copper phthalocyanine dyestuff which comprises reacting together at a temperature in the range from 160–200° C., and in proportions sufficient to produce copper phthalocyanine, biuret, phthalimide, and a copper-yielding compound, in the presence of a catalyst for the reaction.

17. The method as defined in claim 1 in which said biuret is present in the proportion of at least 0.66 mole per mole of said ortho compound.

18. The method as defined in claim 2 in which said biuret is present in the proportion of at least 0.66 mole per mole of said ortho compound.

19. The method as defined in claim 3 in which said biuret is present in the proportion of at least 0.66 mole per mole of said ortho compound.

20. The method as defined in claim 12 in which said biuret is present in the proportion varying from 0.66 mole to 2 moles per mole of phthalic anhydride.

21. The method as defined in claim 13 in which said biuret is present in the proportion varying from 0.66 mole to 2 moles per mole of said ortho compound.

22. The method as defined in claim 14 in which said biuret is present in the proportion varying from 0.66 mole to 2 moles per mole of said ortho compound.

23. The method as defined in claim 15 in which said biuret is present in the proportion varying from 0.66 mole to 2 moles per mole of said ortho compound.

24. The method as defined in claim 16 in which said biuret is present in the proportion varying from 0.66 mole to 2 moles per mole of phthalimide.

GRADY M. O'NEAL.